Figure 1:
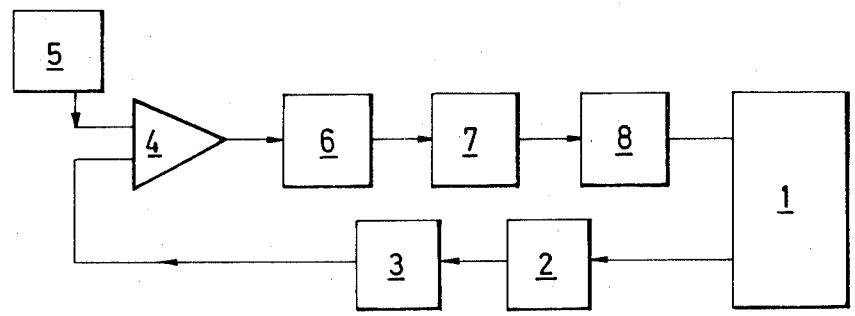

United States Patent [19]

Gillbrand et al.

[11] 4,372,119
[45] Feb. 8, 1983

[54] METHOD OF AVOIDING ABNORMAL COMBINATION IN AN INTERNAL COMBINATION ENGINE AND AN ARRANGEMENT FOR CARRYING OUT THE METHOD

[75] Inventors: Per S. Gillbrand, Enhörna; Simon E. Axelson, Huddinge; Sten R. Jiewertz, Järna, all of Sweden

[73] Assignee: Saab-Scania Aktiebolag, Sodertalje, Sweden

[21] Appl. No.: 151,897

[22] Filed: May 21, 1980

[30] Foreign Application Priority Data

Oct. 29, 1979 [SE] Sweden ............................... 7908944

[51] Int. Cl.³ .............................................. F02B 37/00
[52] U.S. Cl. ...................................................... 60/600
[58] Field of Search ................ 60/600, 601, 602, 603, 60/611; 123/146.5 R, 425, 435, 564

[56] References Cited

U.S. PATENT DOCUMENTS

| | | | |
|---|---|---|---|
| 1,653,877 | 12/1927 | Schaff | 123/435 |
| 2,467,732 | 4/1949 | Davis | 123/435 |
| 2,595,524 | 5/1952 | Henneman et al. | 123/435 |
| 2,958,317 | 11/1960 | McNally | 123/435 |
| 4,197,711 | 4/1980 | Fuhrmann et al. | 60/602 |
| 4,236,491 | 12/1980 | Hattori et al. | 123/425 |
| 4,245,602 | 1/1981 | Omori et al. | 123/425 |
| 4,322,948 | 4/1982 | Emmenthal et al. | 60/602 |

FOREIGN PATENT DOCUMENTS 54-142425 11/1979 Japan ................................. 123/425

OTHER PUBLICATIONS

SAE Paper No. 780414, "Buick's Turbocharged V-6 Powertrain for 1978," T. F. Wallace, Feb. 27, 1978.

Primary Examiner—Michael Koczo
Attorney, Agent, or Firm—Cushman, Darby & Cushman

[57] ABSTRACT

A method of avoiding abnormal combustion, so-called knocking, in an internal combustion engine, where a parameter representative of the combustion conditions in the engine is monitored. When abnormal combustion occurs, a signal representing such abnormal combustion is generated and is used to initiate an adjustment of the engine operating conditions by lowering the engine induction pressure so as to reestablish normal combustion. There is also provided an arrangement for avoiding abnormal combustion.

6 Claims, 2 Drawing Figures

METHOD OF AVOIDING ABNORMAL COMBINATION IN AN INTERNAL COMBINATION ENGINE AND AN ARRANGEMENT FOR CARRYING OUT THE METHOD

The present invention relates to a method of avoiding abnormal combustion, so-called knocking, in an internal combustion engine, preferably an Otto-type engine, comprising the steps of monitoring a parameter representative of the combustion conditions prevailing in the engine, generating, when abnormal combustion occurs in the engine, a knocking signal representing such abnormal combustion, using said knocking signal to initiate an adjustment of the engine operating conditions for eliminating abnormal combustion. The invention also relates to an arrangement on an internal combustion engine for carrying out the method.

In Otto-type engines it is known that knocking can occur in certain operating conditions, especially when the engine is heavily loaded. By "knocking" is meant an uncontrolled combustion of an explosive nature in the cylinders of an engine and it is generated by inducted fuel-air mixture being locally ignited in the combustion chamber before a flame front starting from the spark plug has caused ignition. The engine is thus subjected to high temperature and pressure stresses which can lead to mechanical engine damage.

In Otto-type engines it is previously known to avoid knocking by using a so-called knocking detector. A transducer incorporated in the detector is arranged to sense knocking in the form of a high vibration level for the engine in question and in response thereto to generate an output signal controlling the engine ignition so that ignition of the fuel-air mixture is delayed. This results in that the abnormal course of ignition, i.e. the excessively high vibration level, ceases.

Certain disadvantages accompany the known method, however. Delayed ignition involves a deteriorated thermic efficiency, i.e. higher specific fuel consumption of the engine, which, from the point of view of air pollution, results in poorer exhaust gas composition than what is the case for optimum ignition. Higher exhaust gas temperature is also obtained, which puts increased demands on the material of the parts incorporated in the engine, as well as on engine cooling.

The present invention has the object of controlling the combustion in an engine so that the above-mentioned disadvantages do not occur.

The invention is distinguished in that the engine operating conditions are adjusted by lowering the engine induction pressure to a level providing normal combustion. In the inventive method, the induction pressure of the engine is thus controlled in response to the transducer output signal. As with already known techniques, the reduced induction pressure results in a reduction of engine performance, since the fuel-air quantity fed to the engine decreases. However, alteration in the thermic efficiency is avoided with the use of the invention, i.e. the specific fuel consumption can be maintained unchanged. Furthermore, the exhaust gas pollutants can be maintained substantially unchanged, as well as exhaust gas temperature and demands on the engine cooling system.

In an advantageous embodiment of the invention a signal representing said parameter is compared with a reference signal representing optimum combustion in the engine to obtain a deviation signal representing the knocking signal, and the engine induction pressure is adjusted in response to the magnitude of said knocking signal. This increases the accuracy in the control of the engine induction pressure, and the engine performance loss caused by knocking sensed by the transducer can thus be kept down.

In an inventive arrangement for avoiding abnormal combustion, so-called knocking, in an internal combustion engine, there is included a transducer mounted on the engine for monitoring a parameter representative of the combustion conditions prevailing in the engine, a control unit responsive to signals from said transducer and capable of generating, when abnormal combustion occurs, an output signal controlling a regulating means influencing the engine operating conditions in response to said output signal so as to reestablish normal combustion. Said regulating means is capable of lowering the engine induction pressure.

Figure 2:
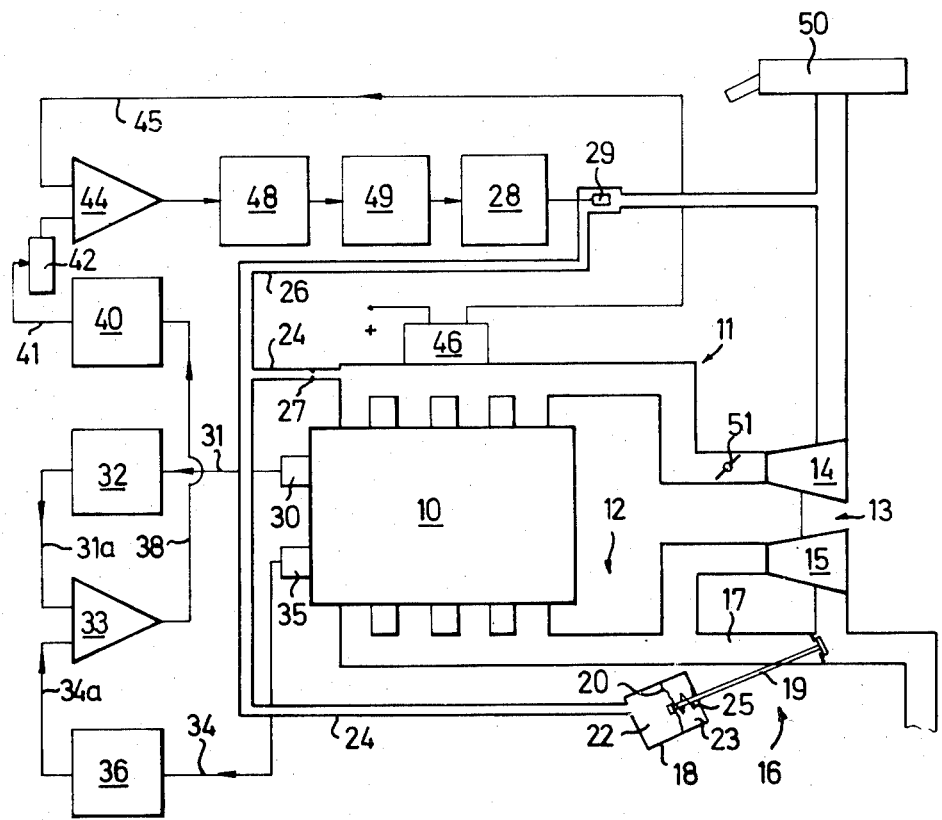

Other distinguishing features of the invention are apparent from the specification below and the following patent claims. The specification relates to the attached drawing, in which:

FIG. 1 schematically illustrates an arrangement for applying the inventive method, and FIG. 2 schematically illustrates an advantageous embodiment of the arrangement illustrated in FIG. 1.

During combustion in an engine 1, a vibration level is obtained which is sensed by a transducer 2 connected to the engine 1. In response thereto, the transducer 2 gives an output signal which is amplified in a following amplifier 3 before it is applied to a comparator 4. The amplified output signal from the transducer 2 is compared in the comparator 4 with a reference value from a reference value source 5, this value representing a vibration level in the engine corresponding to normal combustion. A possible deviation results in a corresponding output signal from the comparator, and after amplification in an amplifier 6 this signal, representing a knocking signal, is taken to an actuating means 7 which in response thereto regulates the pressure in the engine induction system 8. Combustion in the engine 1 is thus affected such that the vibration level subsequently sensed by the transducer 2 is successively reduced and finally results in that the comparator 4 no longer registers deviations.

A more developed embodiment of the inventive arrangement for an Otto-type engine provided with supercharging is illustrated in FIG. 2. Said Otto-type engine comprises an engine 10 proper, an induction system 11 and an exhaust system 12. A turbo-type supercharger unit 13 comprises a centrifugal compressor 14 incorporated in the induction system 11, and an exhaust gas-driven turbine 15 incorporated in the exhaust gas system 12. A valve 16 is arranged to control the exhaust gas flow through a duct 17 leading past the turbine 15 and thus also controls the exhaust gas flow through the turbine 15. The rotational speed of the turbine 15 is thus affected, and thereby the rotational speed of the direct-driven compressor 14 also. Such alteration of rotational speed causes variation in the pressure prevailing in the induction system 11 downstream of the compressor 14, said pressure being subsequently denoted "supercharging pressure." Air is sucked in via an air cleaner 50. Downstream of the compressor 14 there is provided an ordinary throttle valve 51.

The valve 16 conventionally comprises an actuating means 18 by which opening and closing of the valve 16 is controlled. The valve 16, here of the dish-type, is provided with a valve rod 19 rigidly connected to a diaphragm 20 arranged in the actuating means 18. The diaphragm 20 separates the actuating means 18 into an outer and an inner chamber 22 and 23, respectively. The outer chamber 22 is supplied with supercharging pressure via a conduit 24. The inner chamber 23 is in communication with surrounding air, but also houses a helical spring 25 urging the valve 16 in the closing direction. A conduit 26 provides communication between the conduit 24 and the induction system upstream of the compressor 14. The portion of the conduit 24 located between the induction system 11 and the conduit 26 has a restricted through-flow area provided by a constriction 27, this area being significantly smaller than the corresponding area in the conduit 26. Flow through conduit 26 is possible when a regulating means comprising a timing valve 28 having a valve cone 29 in the conduit 26 is in an open position, as illustrated in FIG. 2. The airflow through the conduit 26 is regulated by the timing valve 28, and thereby the pressure which controls the valve 16 via the conduit 24. Regulation of the timing valve 28 is in response to a signal applied to said valve, the level of said signal representing the deviation between the actual supercharging pressure and the maximum supercharging pressure which is allowable for the engine to work optimally, i.e. without abnormal combustion with knocking tendencies.

The signal applied to the timing valve 28 is generated in an electronic control unit, in which there is incorporated a transducer 30 in the form of a so-called accelerometer of a kind known per se. The transducer 30 normally is of piezo-electric type and senses vibrations in the engine walls, said vibrations being directly attributable to the pressure conditions prevailing in the engine 10 during combustion. In response thereto, the transducer 30 generates an output signal which is directly proportional to said pressure conditions. The output signal is sent via a connection 31 to an amplifying circuit 32 and is in amplified form sent to a comparator 33 via a connection 31a.

A distributor 35, conventionally mounted on the engine, generates a pulse train of a frequency directly corresponding to the engine speed. The pulse train is fed via a connection 34 to a converter 36 in which it is converted into an output signal with a voltage varying in response to the frequency of the pulse train. The output signal level from the converter 36 is thus directly proportional to the engine speed, but also serves as a direct reference value for the pressure conditions which should prevail during combustion in an Otto-tupe engine which is working optimally. The output signal from the converter 36 is applied to the comparator 33 via a connection 34a.

The comparison between the signal representing the actual pressure conditions in the engine and the signal representing the criterion value for said pressure conditions, carried out in the comparator 33, results in an output signal having a level representing the difference between said signals. This output signal is taken via a connection 38 to an integrator 40 and the processed output signal therefrom is taken via a connection 41 to a potentiometer 42. The latter allows the signal level to be manually adjusted to a predetermined level for a specific engine before the signal is applied to one input terminal of a comparator 44. Via a connection 45 there is applied to the second input terminal of the comparator 44 a signal from a pressure transducer 46 which senses the supercharging pressure in the induction system 11 and transmits a signal corresponding thereto. The pressure transducer 46 is suitably adapted for transmitting an output signal within an upper supercharging range, within which range regulation of the supercharging pressure is significant from the point of view of knocking.

The comparator 44 generates an output signal representing the difference between the signals received, said output signal being applied to a pulse modulator 48. In the latter the received signal is converted to a pulse train of constant frequency where the relation between the positive and the negative portion of each period is dependent on the level of the output signal from the comparator 44. The pulse train from the pulse modulator 48 is amplified in an amplifier 49, which constitutes the driver for the timing valve 28. The latter functions in principle as a solenoid valve for opening and closing in pace with the changes between the positive and negative period portions of the pulse train.

The components in the electronic control unit described above comprise simple and well-known circuits in electronics and are therefore not described further.

When the engine works normally, the transducer 30 senses a normal vibration level in the engine 10. The level of the signal applied to the comparator 33 thereby falls below the level of the reference signal similarly applied to the comparator 33. The output signal of the comparator 33 thus assumes a level proportional to the difference between the applied signal levels. Subsequent integration of the signals in the integrator 40 generates an output signal therefrom to the connection 41, and after eventual adjustment in the potentiometer 42 said output signal is applied to the comparator 44 and there serves as a criterion level for the signal which is applied to the comparator 44 from the pressure transducer 46. The latter signal represents the actual supercharging pressure, while the signal used as a criterion represents the maximum permitted supercharging pressure for ensuring combustion without knocking. As long as the engine 10 works at a normal vibration level as sensed by the transducer 30, the criterion level applied to the comparator 44 will be so high that the true signal level in the connection 45 will not exceed said criterion level. The output signal from the comparator 44 has a relatively high level and after conversion in the pulse modulator 48 there is obtained a pulse train where the portion of the period causing the timing valve 28 to keep the conduit 26 open is great relative to the period portion causing the timing valve 28 to keep the conduit 26 closed. In the latter case, absence of control pressure from the conduit 24 signifies that the supercharging pressure must achieve comparatively high values before said pressure, via the conduit 24, is capable of opening the valve 16 to decrease the exhaust gas flow through the turbine 15. The compressor 14 is thus permitted to create a high supercharging pressure to the engine 10.

On the other hand, if the transducer 30 senses an abnormally high vibration level as a result of knocking during combustion in the engine 10, it transmits a signal the level of which is higher than normal. The difference from the reference signal level consequently decreases and this results in that the level of the output signal from the comparator 33 decreases, signifying a knocking signal from the comparator 33. Also the output signal level of the integrator 40 decreases. The latter output signal level represents a criterion level for the engine supercharging pressure, which furthermore corresponds to the maximum supercharging pressure permitted for current engine operating conditions. This results in that the level of the maximum permitted supercharging pressure is lowered relative to the normal case. The difference from the signal level in the connection 45, representing true supercharging pressure, is eliminated and the output signal from the comparator 44 changes level. After conversion in the pulse modulator 48, also the relation between the period portions in the pulse train coming from the modulator has been changed. The time during which the timing valve 28 keeps the conduit 26 closed will be great relative to the time during which the conduit 26 is kept open. The drop of control pressure in the conduit 24 will consequently be small and the valve 16 is thus supplied with a comparatively high control pressure which is capable of opening the valve 16 early, i.e. at relatively low supercharging pressure. The exhaust gas flow through the turbine 15 decreases and thereby also the supercharging pressure generated in the compressor 14. The decrease in supercharging pressure reduces the tendency to knocking during combustion in the engine, sensed by the transducer 30, and then there is a renewed regulation of the timing valve and so on.

In relation to the general solution depicted in FIG. 1, the version illustrated in FIG. 2 provides not only a comparison relating to the engine vibration level, but also a second comparison relating to the engine supercharging pressure. Said supercharging pressure comparison ensures that the engine is not supplied with a higher supercharging pressure than the criterion pressure set by the potentiometer 42, even if the engine is fed with a fuel having a knocking tendency which is so low, i.e. the octane number is so high, that a higher supercharging pressure could be used without knocking occurring during combustion. If the supercharging pressure comparison were not carried out, there would be no upper limit for the supercharging pressure in this case. Engine performance could thus reach levels for which the engine is not designed.

In practice, an inventive embodiment according to FIG. 2 comprises further detail solutions having the task, for instance, of ensuring that the engine is not subjected to excessively high supercharging pressures if a fault occurs in the system, e.g. the transducer ceases to function or rupture occurs in the conduits 24,26, etc.

The invention can be modified in a plurality of alternative embodiments within the scope of the following patent claims. The number of transducers can thus be varied, and their output signal can be processed in different ways before permitted to actuate the regulating means affecting the induction pressure. Said regulating means can comprise an ordinary throttle valve in the induction system or a separate means directly or indirectly controlling the engine induction pressure.

In the embodiment described above, the transducer mounted on the engine is adapted for sensing the vibration level of the engine, but it would also be possible to use a transducer monitoring some other parameter representative of the combustion conditions in the engine, such as for instance the temperature or the pressure in the engine. It would also be possible to use a combination of different such transducers.

What we claim is:

1. A method of avoiding abnormal combustion, so-called knocking, in a supercharged internal combustion engine, comprising the steps of monitoring a parameter representative of the combustion conditions prevailing in the engine, generating a first signal representing said parameter, sensing the engine speed, generating a second signal proportional to the engine speed and representing optimum combustion in the engine, comparing said first signal with said second signal to obtain a deviation signal, whereby, when abnormal combustion occurs in the engine, said deviation signal initiates an adjustment of the engine operating conditions for eliminating abnormal combustion, wherein the engine operating conditions are adjusted by reducing the engine induction pressure in response to the magnitude of said deviation signal to a level providing normal combustion.

2. A method as claimed in claim 1, further comprising the steps of integrating the deviation signal, sensing the actual induction pressure of the engine and generating an induction signal representative thereof, comparing the integrated deviation signal with said induction signal and regulating the induction pressure in response to the magnitude of a deviation signal obtained from said comparison.

3. A method as claimed in claim 1, wherein as a parameter is used the vibration level of the engine.

4. An arrangement for avoiding abnormal combustion, so-called knocking, in an internal combustion engine, comprising an induction system leading combustion air to said engine, a supercharger generating a boost pressure in said induction system, a pressure transmitting system connected to said induction system, a solenoid valve in said pressure transmitting system influencing said boost pressure, a transducer mounted on the engine for monitoring the vibration level in the engine, the vibration level being representative of the combustion conditions prevailing in the engine, a control unit responsive to signals from said transducer and generating, when abnormal combustion occurs, an output signal, a means generating, in response to the engine speed, a reference signal representing the parameter value at optimum combustion, a first comparator in the control unit for comparing the transducer signal with said reference signal and for generating as said output signal a deviation signal controlling said solenoid valve influencing the engine induction pressure, a connection means between said control unit and said valve leading said output signal to said valve, which valve induces a reduction of said boost pressure in response to said output signal so as to reestablish normal combustion.

5. An arrangement as claimed in claim 4, comprising an integrator in the control unit for summing said deviation signal, a pressure transducer for generating a pressure signal representing the actual boost pressure of the engine, a second comparator for comparing said summed deviation signal with said pressure signal and for generating said output signal controlling said solenoid valve influencing the engine induction pressure.

6. An arrangement for avoiding abnormal combustion, so-called knocking, in an internal combustion engine, comprising an induction system leading combustion air to said engine, an exhaust system leading exhaust gas from the engine, a supercharger generating a boost pressure in said induction system, an exhaust gas driven turbine in said exhaust system driving said supercharger, a valve in said exhaust system controlling the exhaust gas flow through said turbine, pressure actuated servo means for operation of said valve, a pressure transmitting conduit between the induction system downstream the supercharger and said servo means, a pressure relieving conduit connected to said pressure transmitting conduit, a solenoid valve in said pressure relieving conduit controlling the pressure relief from said pressure transmitting conduit, a transducer mounted on the engine for monitoring the vibration level in the engine, the vibration level being representative of the combustion conditions prevailing in the engine, a control unit responsive to signals from said transducer and generating, when abnormal combustion occurs, a pulsed output signal, a connection means between said control unit and said valve leading said pulsed output signal to said solenoid valve, whereby the pressure transmitted to said servo means is controlled so that the operation of said valve in the exhaust system and thereby the turbine driving the supercharger induces a reduction of said boost pressure.

* * * * *